US007140963B2

(12) United States Patent
Kojima

(10) Patent No.: US 7,140,963 B2
(45) Date of Patent: Nov. 28, 2006

(54) GAMING MACHINE WITH REELS AND DISPLAY DEVICE DISPLAYING CHARACTERS THEREON, REELS BEING SEEN THROUGH DISPLAY DEVICE

(75) Inventor: Sakiko Kojima, Tokyo (JP)

(73) Assignee: Aruze Corp., Tokyo (JP)

( * ) Notice: Subject to any disclaimer, the term of this patent is extended or adjusted under 35 U.S.C. 154(b) by 48 days.

(21) Appl. No.: 10/869,940

(22) Filed: Jun. 18, 2004

(65) Prior Publication Data

US 2004/0266521 A1 Dec. 30, 2004

(30) Foreign Application Priority Data

Jun. 24, 2003 (JP) ............................ 2003-180043

(51) Int. Cl.
*A63F 13/00* (2006.01)

(52) U.S. Cl. ........................................................ 463/20

(58) Field of Classification Search .................. 463/20, 463/30, 43; 273/143 R
See application file for complete search history.

(56) References Cited

U.S. PATENT DOCUMENTS

| | | | | |
|---|---|---|---|---|
| 2001/0031658 A1 | 10/2001 | Ozaki et al. | | |
| 2003/0087690 A1 | 5/2003 | Loose et al. | | |
| 2003/0119577 A1 | 6/2003 | Motegi et al. | | |
| 2003/0130034 A1* | 7/2003 | Suganuma et al. | ........... | 463/30 |
| 2004/0014519 A1* | 1/2004 | Iwamoto et al. | .............. | 463/20 |
| 2005/0192090 A1* | 9/2005 | Muir et al. | ................... | 463/30 |

FOREIGN PATENT DOCUMENTS

| | | | |
|---|---|---|---|
| JP | 08-117409 | A | 5/1996 |
| JP | 2000-325597 | A | 11/2000 |
| JP | 2001-062032 | A | 3/2001 |
| WO | WO-00-32286 | A | 6/2000 |
| WO | WO-03-039699 | A1 | 5/2003 |

OTHER PUBLICATIONS

European Search Report, Appln. No. 04014465.1-2221-, dated Apr. 8, 2005.

* cited by examiner

*Primary Examiner*—Kim Nguyen
(74) *Attorney, Agent, or Firm*—Rader, Fishman & Grauer PLLC

(57) ABSTRACT

It is disclosed the gaming machine in which the lower liquid crystal display 4 is arranged in front of the reels 22 which are mechanically driven and each reel 22 is seen through each of the display windows 23, 24, 25 of the lower liquid crystal display 4. And the character is dynamically displayed on the lower liquid crystal display 4 and the reel operation of the reel 22 is changed. At that time, the reel operation is stopped at the timing that the character crosses each of the display windows 23, 24, 25 of the lower liquid crystal display 4.

3 Claims, 12 Drawing Sheets

FIG.15

| | |
|---|---|
| EFFECT A | REEL STOP TIMING $\alpha$ |
| EFFECT B | REEL STOP TIMING $\beta$ |
| EFFECT C | REEL STOP TIMING $\beta$ |
| EFFECT D | REEL STOP TIMING $\gamma$ |

FIG.16

| | LEFT REEL STOP | CENTER REEL STOP | RIGHT REEL STOP |
|---|---|---|---|
| REEL STOP TIMING $\alpha$ | 3.0sec | 3.0sec | 3.0sec |
| REEL STOP TIMING $\beta$ | 3.0sec | 2.0sec | 5.0sec |
| REEL STOP TIMING $\gamma$ | 2.0sec | 0.5sec | 2.5sec |

FIG.17

| | FIRST STOP | SECOND STOP | THIRD STOP |
|---|---|---|---|
| REEL STOP TIMING $\alpha$ | RIGHT REEL 3.0sec | CENTER REEL 3.0sec | LEFT REEL 3.0sec |
| REEL STOP TIMING $\beta$ | CENTER REEL 3.0sec | RIGHT REEL 0.5sec | LEFT REEL 2.0sec |
| REEL STOP TIMING $\gamma$ | LEFT REEL 2.0sec | RIGHT REEL 2.0sec | CENTER REEL 5.0sec |

FIG.18

| | |
|---|---|
| EFFECT A | 6.0sec SURERIMPOSE CHARACTER WITH CENTER DISPLAY WINDOW |
| EFFECT B | 3.0sec SURERIMPOSE CHARACTER WITH RIGHT DISPLAY WINDOW |
| EFFECT C | 3.0sec SURERIMPOSE CHARACTER WITH RIGHT DISPLAY WINDOW |
| | 6.0sec SURERIMPOSE CHARACTER WITH CENTER DISPLAY WINDOW |
| | 9.0sec SURERIMPOSE CHARACTER WITH LEFT DISPLAY WINDOW |
| EFFECT D | 9.0sec SURERIMPOSE CHARACTER WITH LEFT DISPLAY WINDOW |

FIG.19

| | RIGHT REEL STOP | CENTER REEL STOP | LEFT REEL STOP |
|---|---|---|---|
| REEL STOP TIMING | 3.0sec | 3.0sec | 3.0sec |

GAMING MACHINE WITH REELS AND DISPLAY DEVICE DISPLAYING CHARACTERS THEREON, REELS BEING SEEN THROUGH DISPLAY DEVICE

CROSS-REFERENCE TO THE RELATED APPLICATION (S)

This application is based upon and claims a priority from the prior Japanese Patent Application No. 2003-180043 filed on Jun. 24, 2003, the entire contents of which are incorporated herein by reference. This application is related to co-pending U.S. patent application entitled to "GAMING MACHINE IN WHICH SECOND GAME CAN BE OBTAINED CONTINUOUS TO FIRST GAME UNDER PREDETERMINED CONDITION", the application being filed on even date herewith. The co-pending application is expressly incorporated herein by reference.

BACKGROUND OF THE INVENTION

1. Field of the Invention

The present invention relates to a gaming machine having a display device on which characters are displayed and through which reels can be seen.

2. Description of Related Art

In a conventional gaming machine, for example, a slot machine, as shown in Japanese Unexamined Publication No. 2001-62032, it is proposed a gaming machine that a player can see symbols formed on reels, which are rotated and stopped, through a display device arranged in front of the reels. Therefore, in a case that pay lines, messages, characters or marks are displayed on the display device in overlapping the symbols of the reels or in periphery of the symbols of the reels, the reels being seen by the player through the display device, various effects concerning with the reels can be done.

However, the display timing that characters are displayed on the display device in overlapping the symbols of the reels or in periphery of the symbols of the reels is set during rotation of the reels or after the reels are stopped, and display positions of characters are fixed beforehand. Thus, it cannot be conducted effect dynamically correlating characters with the reels.

SUMMARY OF THE INVENTION

The present invention has been done taking the above situation into consideration and has an object to provide a gaming machine in which effect dynamically correlating characters with reels can be done.

In order to accomplish the above object, according to one aspect of the present invention, it is provided a gaming machine comprising:

a plurality of reels which are mechanically driven;

a reel controller for changing operation of each reel;

a display device which is arranged in front of the reels and has a plurality of reel display windows, each of the reels being seen through each of the reel display windows;

a display controller for controlling the display device so as to display a character on the display device;

wherein the character is dynamically displayed on the display device by the display controller; and wherein the operation of each reel is changed by the reel controller at a timing that the character crosses each reel display window.

In the above gaming machine, the display device is arranged in front of each of the reels which are mechanically driven and a player can see each reel through each reel display window in the display device. And the character is dynamically displayed on the display device by the display controller and the reel operation of each reel is changed by the reel controller. At that time, the reel controller changes the reel operation at the timing that the character crosses each reel display window in the display device. Therefore, it can be given to the player seeing the display device an impression as if the character dynamically displayed on the display device is dynamically correlated with stop of rotation of each reel which can be seen through the display device at the timing that the character crosses each of the reel display windows.

That is to say, in the gaming machine of the present invention, since it can be given the impression as if the character is dynamically correlated with the reel operation of each reel, it can be done the effect in which there is a dynamic correlation between the character and the reels and interest of the player for games can be raised.

Here, in the gaming machine according to the present invention, the reel controller may stop the reel operation. In this case, since stop of the reel operation of each reel remarkably influences the game contents done in the gaming machine and the impression given to the player becomes very strong, it can be effectively done the effect in which the character and the reels are dynamically combined.

And the gaming machine may be constructed so that the gaming machine comprises a memory for storing a control table in which a stop order of each reel and a time lapsing till the character crosses each reel display window from a display start of the character on the display device are corresponded with each other, and wherein the reel controller stops each reel based on the stop order of each reel and the lapsed time in the control table stored in the memory.

Further, the gaming machine may be constructed so that the gaming machine comprises a determination device for determining whether the character displayed on the display device exists within coordinates specifying each reel display window or not, and wherein when the determination device determines that the character exists within the coordinates of each reel display window, the reel controller stops the reel corresponding to the reel display window.

Here, the word "the timing that the character crosses each reel display window in the display device" includes, for example, "the timing right after the character enters in the reel display window from outside" or "the timing right after the character comes out from the reel display window".

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 15 is an explanatory view schematically showing a table utilized in control of effect contents on the lower liquid crystal display, the table correlating each of effect contents with each reel stop timing, FIG. 16 is an explanatory view schematically showing a table utilized in control of effect contents on the lower liquid crystal display, the table defining each of control contents corresponding to each reel stop timing, FIG. 17 is an explanatory view schematically showing another table utilized in control of effect contents on the lower liquid crystal display, the table defining each of control contents corresponding to each reel stop timing, FIG. 18 is an explanatory view schematically showing a table utilized in control of effect contents on the lower liquid crystal display, the table defining each of effect contents, and FIG. 19 is an explanatory view schematically showing further another table utilized in control of effect contents on the lower liquid crystal display, the table defining each of control contents corresponding to each reel stop timing.

DETAILED DESCRIPTION OF THE PREFERRED EMBODIMENTS

Hereinafter, the gaming machine according to the present invention will be described according to the embodiment embodying the invention, with reference to the drawings.

Figure 1:
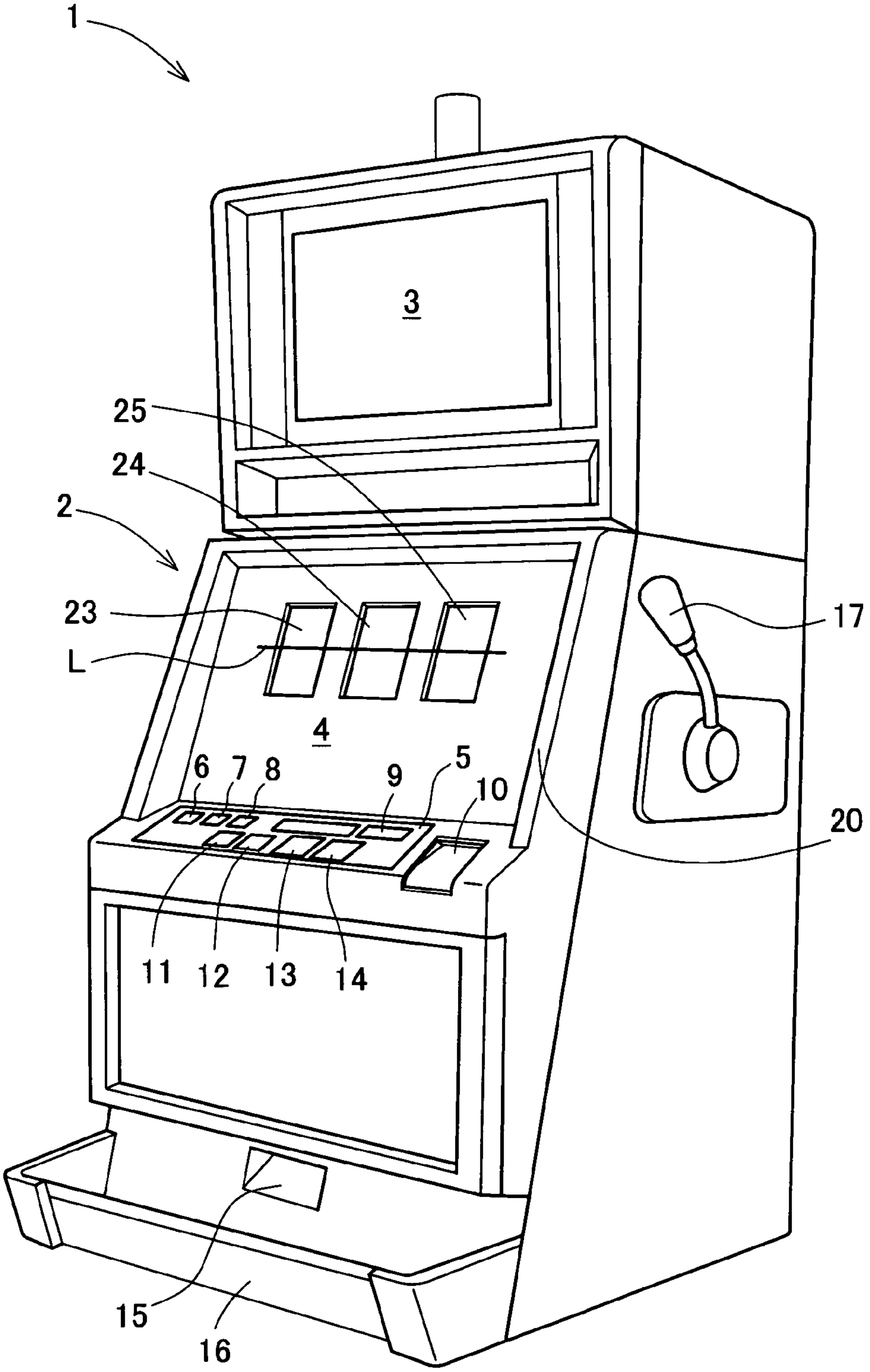
FIG. 1 is a perspective view of a slot machine.

First, an outline construction of the gaming machine according to the embodiment will be described with reference to FIG. 1. Here, in the embodiment, the slot machine as an example of the gaming machine will be explained. FIG. 1 is a perspective view of the slot machine.

In FIG. 1, the slot machine 1 has a cabinet 2 constructing a whole of the slot machine 1. At a front upper part of the cabinet 2 an upper liquid crystal display 3 is arranged, and at a front central part of the cabinet 2 a lower liquid crystal display 4 is arranged. Here, the upper liquid crystal display 3 is constructed from a liquid crystal display device which is generally used, and the lower liquid crystal display 4 is constructed from, so-called, a transparent liquid crystal display device. A detailed construction of the transparent liquid crystal display device will be explained hereinafter.

An operation table 5, which is projected frontward, is formed below the lower liquid crystal display 4, and from the most left side on the operation table 5, a change button 6, a payout (cash out) button 7, a help button 8 are arranged. And a coin insertion slot 9 and a bill insertion slot 10 are arranged at the right side of the help button 8. Further, from the left side, a 1-BET button 11, a SPIN/REPEAT BET button 12, a 3-BET button 13 and a 5-BET button 14 are positioned at the front side on the operation table 5.

Here, the change button 6 is pressed when exchanging the bill inserted in the bill insertion slot 10, and the exchanged coins are paid out through a coin payout hole 15 to a coin tray 16 which is formed at the lower part of the cabinet 2. To the change button 6, a change switch 62 (explained hereinafter) is attached, and the a switch signal is output to a CPU 50 (mentioned hereinafter) from the change switch 62 based on press of the change button 6.

The CASH-OUT button 7 is usually pressed when games are terminated, and when the CASH-OUT button 7 is pressed coins got in games are paid out through the coin payout hole 15 to the coin tray 16. Here, to the CASH-OUT button 7, a payout (cash out) switch 63 (mentioned hereinafter) is attached and a switch signal is output to the CPU 50 from the payout switch 63 based on press of the CASH-OUT button 7.

The help button 8 is pressed when the player does not understand game operation method, and when the help button 8 is pressed, various help information is displayed on the upper liquid crystal display 3 or the lower liquid crystal display 4. To this help button 8, a help switch 64 (mentioned hereinafter) is attached and a switch signal is output to the CPU 50 from the help switch 64 based on press of the help button 8.

To the coin insertion slot 9 a coin sensor 65 (mentioned hereinafter) is positioned, and when the coin is inserted in the coin insertion slot 9 a coin detection signal is output to the CPU 50 through the coin sensor 65. And to the bill insertion slot 10 a bill sensor 66 (mentioned hereinafter) is positioned, and when the bill is inserted in the bill insertion slot 10 a bill detection signal is output to the CPU 50 through the bill sensor 66.

As for the 1-BET button 11, every the 1-BET button 11 is pressed one credit is betted, and the 1-BET button 11 can bet by pressing up to tree times as the maximum pressing time. To the 1-BET button 11, a 1-BET switch 59 is attached and when the 1-BET button 11 is pressed a switch signal is output to the CPU 50 from the 1-BET switch 59 based on press of the 1-BET button 11.

The SPIN/REPEAT BET button 12 is the button to start games from the present bet number or the previous bet number by press thereof, thereby reels (mentioned later) are started to rotate. To the SPIN/REPEAT BET button 12, a spin switch 58 (mentioned later) is attached, and when the SPIN/REPEAT BET button 12 is pressed a switch signal is output to the CPU 50 from the spin switch 58 based on press of the SPIN/REPEAT BET button 12. Here, as the bet number which can be betted by press of the SPIN/REPEAT BET button 12, there may exist 1, 2, 3 and 5 bets.

The 3-BET button 13 is the button to start games from 3 bets on the basis of press thereof. To this 3-BET button 13, a 3-BET switch 60 (mentioned hereinafter) is attached and when the 3-BET button 13 is pressed a switch signal is output to the CPU 50 from the 3-BET switch 60. And the 5-BET button 14 is the button to start games from 5 bets on the basis of press thereof or to be pressed when a bonus game (mentioned hereinafter) is started. To the 5-BET button 14, a 5-BET switch 61 is attached and when the 5-BET button is pressed a switch signal is output to the CPU 50 from the 5-BET switch 61 on the basis of press thereof.

Further, at the lower part of the cabinet 2, the coin payout hole 15 is formed and the coin tray 16 to receive coins paid out from the coin payout hole 15 is provided. In the coin payout hole 15, a coin detection part 73 constructed from a sensor and the like is positioned and the coin detection part 73 detects number of coins paid out from the coin payout hole 15.

Further, at the side plane (the right side plane in FIG. 1) of the cabinet 2, a start lever 17 is arranged rotatably within a predetermined angle range. To the start lever 17, a start switch 57 is attached and when the start lever 17 is rotated a switch signal occurring from the start switch 57 is output to the CPU 50.

Figure 2:
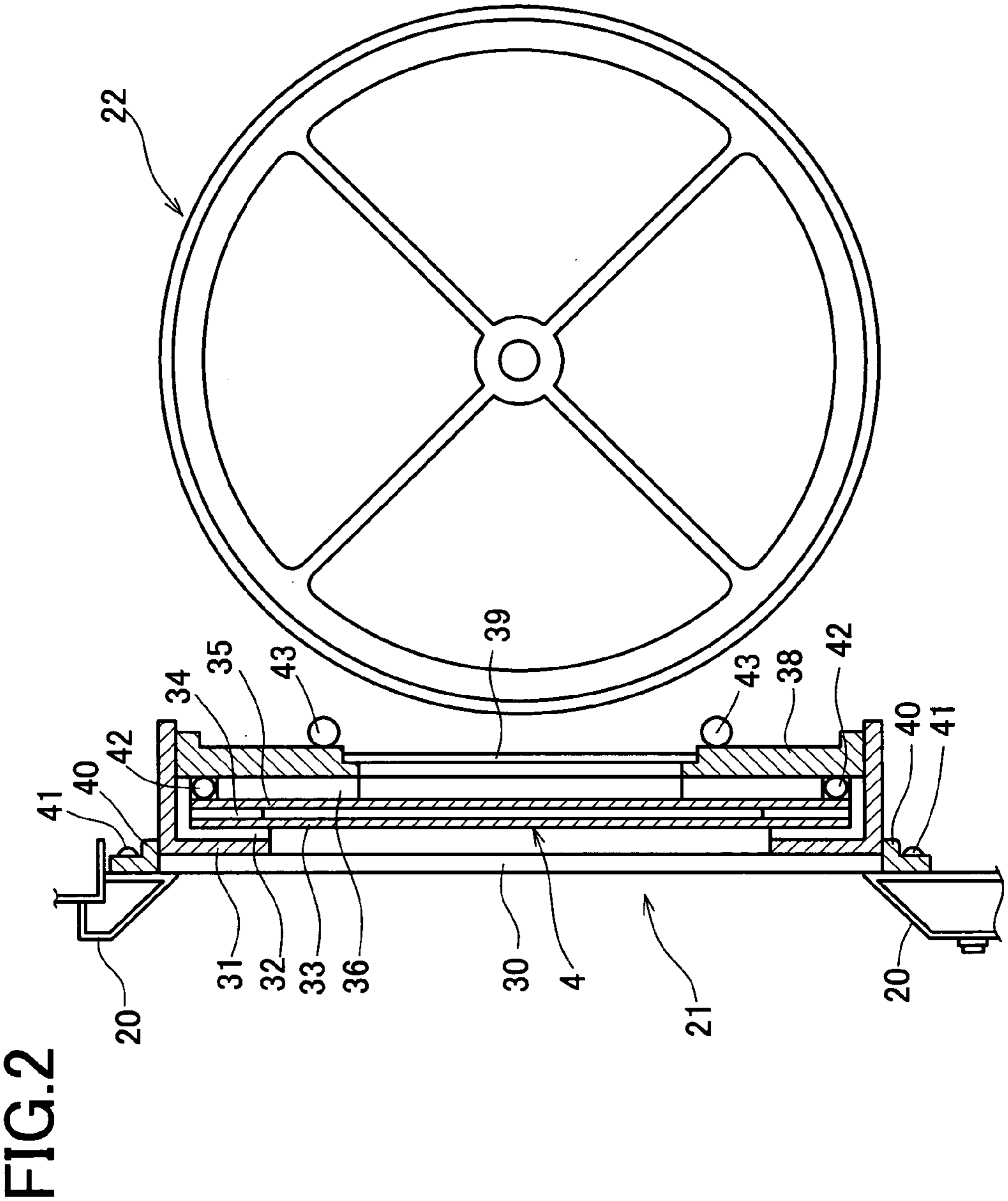
FIG. 2 is a longitudinal sectional view of a lower liquid crystal display and a reel, FIG. 3, consisting of FIGS. 3A through 3J, are exploded perspective views showing the lower liquid crystal display.
Figures 3A, 3B, 3C, 3D, 3E, 3F, 3G, 3H, 3I, 3J:
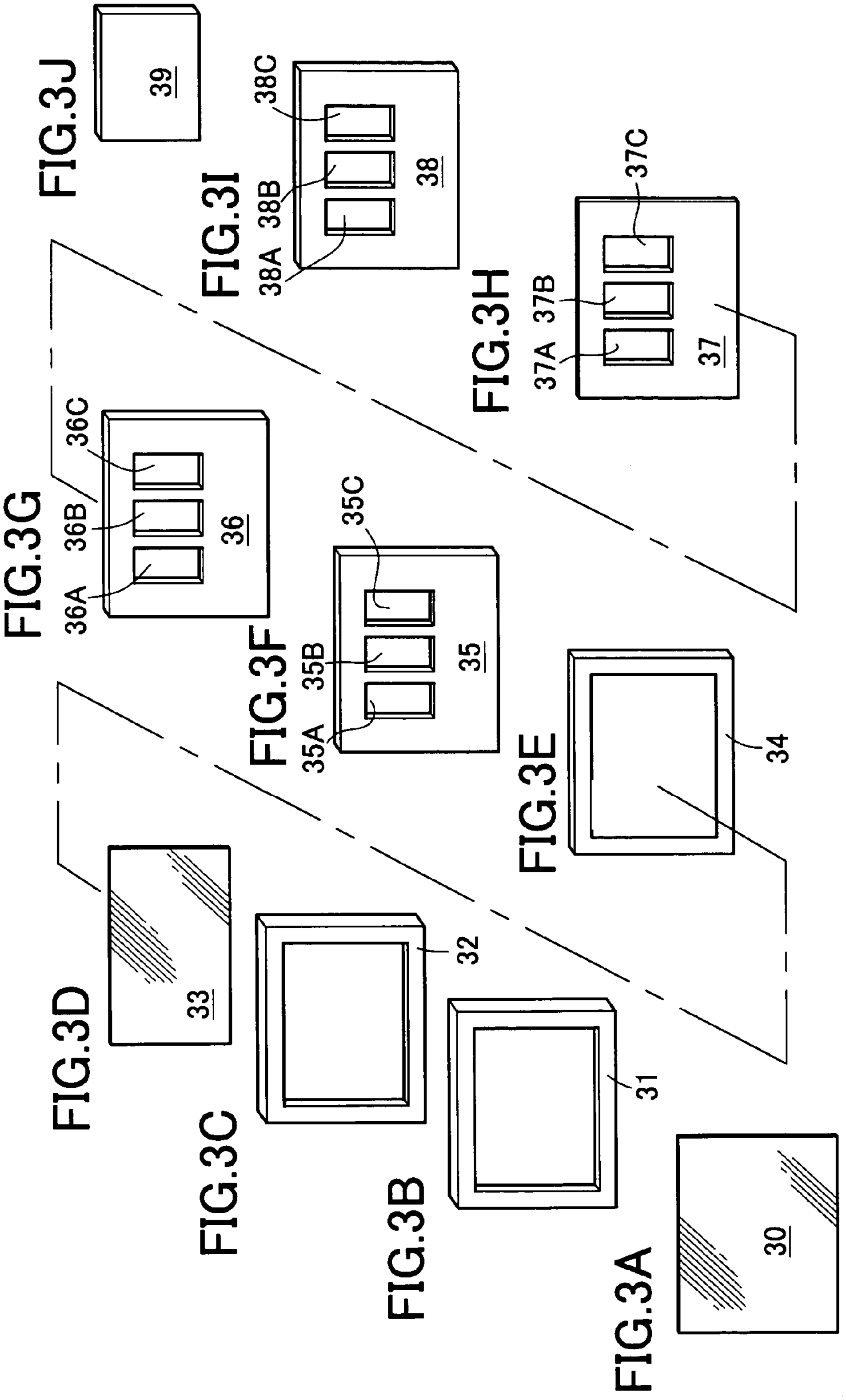

Next, it will be described a detailed construction of the lower liquid crystal display 4 and reels rotatably arranged behind the lower liquid crystal display 4 in the cabinet 2, with reference to FIGS. 2 and 3. FIG. 2 is a longitudinal sectional view of the lower liquid crystal display and the reels, and FIG. 3 is an exploded perspective view of the lower liquid crystal display 4.

In FIGS. 2 and 3, the lower liquid crystal display 4 is arranged within a display window 21 of a device front panel 20 positioned at the front center part of the cabinet 2 in the slot machine 1, with a touch panel 30 arranged at the front side (the left side in FIG. 2) of the lower liquid crystal display 4. And at the rear side (the right side in FIG. 2) of the lower liquid crystal display 4, three reels 22 (only one reel 22 is indicated in FIG. 2) are supported in a parallel state so that the reels 22 become independently rotatable.

Here, each reel 22 will be described. Among three reels 22, the left reel 22 when seeing the front plane of the slot machine 1 faces to a left display window 23 (see FIG. 1) formed in the lower liquid crystal display 4, the center reel 22 faces to a center display window 24 (see FIG. 1) similarly formed in the lower liquid crystal display 4 and the right reel 22 faces to a right display window 25 (see FIG. 1) similarly formed in the lower liquid crystal display 4. Construction of each of the display windows 23, 24, 25 will described hereinafter.

Figure 4:
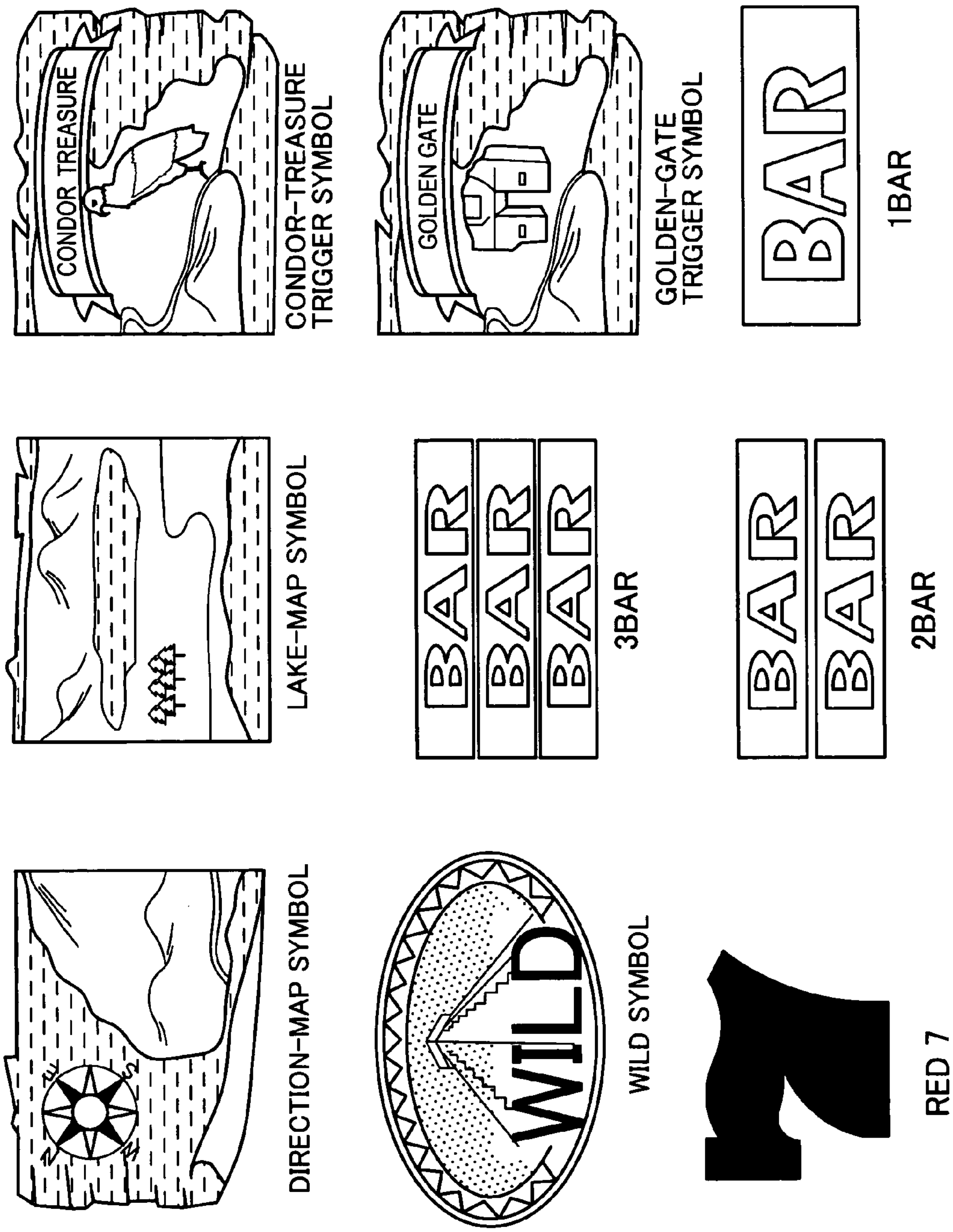
FIG. 4 is an explanatory view of symbols formed on an outer periphery of the reel.

Further, on an outer periphery of each reel 22, various kinds of symbols shown in FIG. 4 (9 kinds of symbols are indicated in FIG. 4) are formed. Concretely, as kinds of symbols formed on the outer periphery of the reel 22, concerning with game contents conducted in the slot machine 1, it is utilized a direction-map symbol, a lake-map symbol, a condor-treasure trigger symbol, a WILD symbol, a 3BAR symbol, a golden-gate trigger symbol, a RED 7 symbol, a 2BAR symbol and a 1BAR symbol. And these 9 kinds of symbols and blank (s) (area where the symbol do not exist) are combined based on a predetermined combination and the combinations in which the symbols and the blanks are totally combined (the total number of the symbols and the blanks is 22) are formed. On the outer periphery of each reel 22, such combination with symbols and blanks (total number of which is 22) is formed.

Here, various winning combinations are determined beforehand based on plural kinds of combinations of the symbols and when the symbol combination corresponding to the winning combination is stopped along a pay line L (see FIG. 1), coins are paid out from the coin payout hole 15 according to the winning combination. These points are as same as that in the conventional slot machine, therefore explanation thereof will be omitted. And formation of the symbols on the outer periphery of the reel 22 is generally done as follows. First, symbols and blanks (total number of which is 22) are printed on a long seal having a width and a length corresponding to the width and the periphery length of the reel 2, respectively. And such seal is adhered on the peripheral plane of the reel 22. Of course, the symbols may be formed by different method other than the above method.

In the embodiment, the pay line L is determined to only the center line, and such pay line L is displayed on the lower liquid crystal display 4 when games are conducted by rotating and stopping the reels 22 based on press of the SPIN/REPEAT BET button 12, the 3-BET button and the 5-BET button 14 or rotation of the start lever 17. On the other hand, the pay line L is eliminated from the lower liquid crystal display 4 when the bonus game is conducted based on press of the 5-BET button 14 in obtaining various bonus games.

As for the trigger symbols, there are the condor-treasure trigger symbol and the golden-gate trigger symbol, and these trigger symbols are function as triggers to obtain various bonus games. In the embodiment, one condor-treasure trigger symbol and one golden-gate trigger symbol are formed on only the outer periphery of the right reel 22. Further, a bonus game concerning with a condor-treasure bonus can be obtained based on that the direction-map symbol existing on the outer periphery of the left reel 22, the lake-map symbol existing on the center reel 22 and the condor-treasure trigger symbol existing on the right reel 22 stop along the pay line L. And a bonus game concerning with the a golden-gate bonus can be obtained based on that the direction-map symbol existing on the left reel 22, the lake-map symbol existing on the center reel 22 and the golden-gate trigger symbol existing on the right reel 22 stop along the pay line L.

Next, construction of the lower liquid crystal display 4 will be described with reference to FIGS. 2 and 3A~3J. In FIGS. 2 and 3A~3J, the lower liquid crystal display 4 is constructed by arranging from the front side of the slot machine 1; the transparent touch panel 30, the reel glass base 31, the bezel metal frame 32, the transparent liquid crystal panel 33, the liquid crystal holder 34, the diffusion sheet 35, the light guiding plate 36, the white reflector 37, the rear holder 38 and the antistatic sheet 39. In the diffusion sheet 35, three openings 35A, 35B, 35C are formed. Similarly, in the light guiding plate 36, the reflector 37 and the rear holder 38, three openings 36A, 36B, 36C, 37A, 37B, 37C, 38 A, 38B, 38C are formed respectively, so as to coincide with the openings 35A, 35B, 35C. Here, the openings 35A~38A construct the left display window 23 (see FIG. 1) by superimposing so as to coincide with each other. Similarly, the openings 35B~38B construct the center display window 24 (see FIG. 1) by superimposing so as to coincide with each other and the openings 35C~38C construct the right display window 25 by superimposing so as to coincide with each other. Here, the openings 35A~35C in the diffusion sheet 35 and the openings 36A~36C in the light guiding plate 36 construct the light transmitting areas to retain visibility while variable displaying is conducted by rotating reels 22.

In order to install the lower liquid crystal display 4 to the display window 21 of the device front panel 20, as shown in FIG. 2, brackets 40 are screwed to the rear side of the device front panel 20 by screws 41.

And at an upper and lower end of the light guiding plate 36, a pair of cathode ray tubes 42 may be arranged as light sources of the liquid crystal panel 33. And at an upper and lower positions in the rear side of each of openings 38A~38C in the rear holder 38, a pair of cold cathode ray tubes 43 are arranged to illuminate the symbols on the outer periphery of each of the reels 22.

The liquid crystal panel 33 is a transparent electric display panel on which transparent electrodes such as ITO are formed, and arranged in front of each of the reels 22 which can be seen therethrough. And the circumference in rear side of the display part of the liquid crystal panel 33 is held by the liquid crystal holder 34. The light guiding plate 36 is made from the light transmitting resin panel, and in the light guiding plate 36 lens cut portions are formed, the lens cut portions leading light emitted from the cold cathode ray tubes 43 positioned at side positions to the rear side of the liquid crystal panel 33. The light diffusion sheet 35 is made from a light transmitting resin sheet and scatters light led by the light guiding plate 36 and levels light irradiated to the liquid crystal panel 33. The liquid crystal holder 34 for holding the liquid crystal panel 33, the diffusion sheet 35 and the light guiding plate 36 are assembled into one-piece construction and circumference thereof is inserted in the bezel metal frame 32. Thereby, the front side of the display part in the liquid crystal panel 33 is retained by the bezel metal frame 32.

Circumference of the liquid crystal holder 34, the light diffusion sheet 35 and the light guiding plate 36, which are inserted in the bezel metal frame 32 and assembled into one-piece construction, is further inserted in the reel glass base 31 and retained by the reel glass base 31 in a state that the front display plane of the liquid crystal panel 33 is opened. The transparent touch panel 30 is pressed and contacted to the front side of the reel glass base 31 by installing the reel glass base 31 to the device front panel 20 through the screws 41, thereby the transparent touch panel 30 is superimposed on the front display plane of the liquid crystal panel 33.

The rear holder 38 is made from a white resin plate and retains to the reel glass base 31 the bezel metal frame 32 supported to the reel glass base 31, the liquid crystal holder 34 holding the liquid crystal panel 33, the light diffusion sheet 35 and the light guiding plate 36 from the rear sides thereof. The rear holder 38 also functions as a reflecting plate for reflecting light emitted from the cold cathode ray tubes 43 to the light guiding plate 36 toward the liquid crystal panel 33. The antistatic sheet 39 is made transparent and adhered to the rear plane of the rear holder 38 by double-sided adhesive tape, thereby the antistatic sheet 39 covers the rear plane of each of the openings 38A~38C formed in the rear holder 38.

Figure 5:
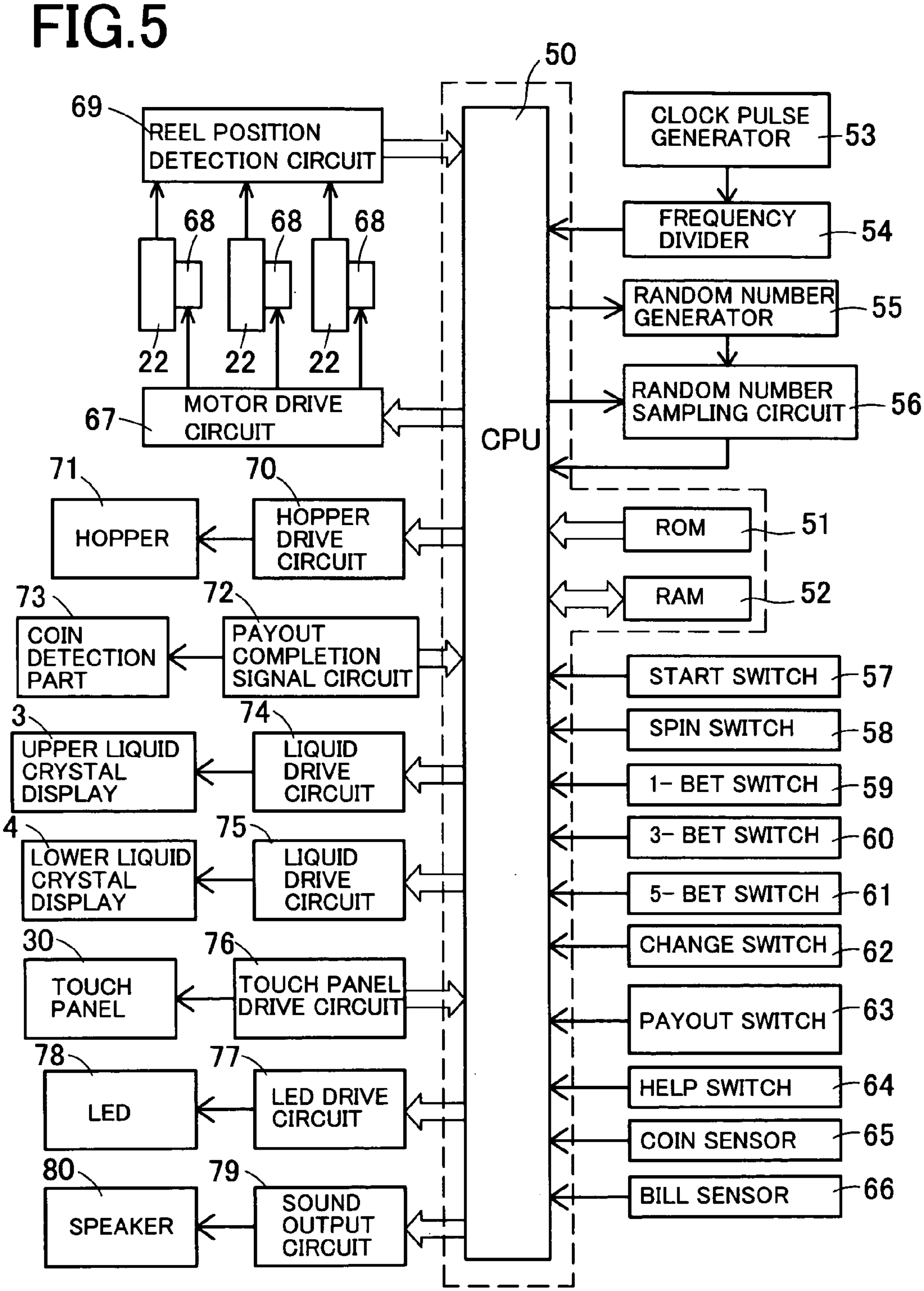
FIG. 5 is a block diagram schematically showing a control system of the slot machine.

Next, construction of the control system in the slot machine 1 will be described with reference to FIG. 5. FIG. 5 is a block diagram schematically showing the control system in the slot machine 1.

In FIG. 5, the control system of the slot machine 1 is basically constructed from the CPU 50, and a ROM 51 and a RAM 52 are connected to the CPU 50. The ROM 51 stores game control program (mentioned later), various effect programs for executing various effects on the upper liquid crystal display 3 and the lower liquid crystal display 4 according to progress in games, lottery program for conducting lottery of various winning combinations, various programs necessary for controlling the slot machine 1 and various data tables and the like. And the RAM 52 is a memory for temporarily storing various data calculated by the CPU 50.

And to the CPU 50, a clock pulse generator 53 for generating standard clock pulses and a frequency divider 54 are connected, and a random number generator 55 and a sampling circuit 56 are also connected. Random number sampled by the random number generator 56 is utilized in various lotteries of the winning combinations, the effects and the like. Further, to the CPU 50, the start switch 57 attached to the start lever 17, the spin switch 58 attached to the SPIN/REPEAT BET button 12, the 1-BET switch 59 attached to the 1-BET button 11, the 3-BET switch 60 attached to the 1-BET button 13, the change switch 62 attached to the CASH-OUT button 7 and the help switch 63 attached to the help button 8 are connected respectively. The CPU 50 controls the slot machine 1 to execute various operations corresponding to each button, based on the switch signal output from each switch when such buttons are pressed.

Further, to the CPU 50, the coin sensor 65 positioned in the coin insertion slot 9 and the bill sensor 66 positioned in the bill insertion slot 10 are connected respectively. The coin sensor 65 detects coins inserted from the coin insertion slot 9 and the CPU 50 calculates the number of inserted coins based on the coin detection signal output from the coin sensor 65. The bill sensor 66 detects the kind and sum of bill and the CPU 50 calculates the number of coins equivalent to sum of bill, based on the bill detection signal output from the bill sensor 66.

To the CPU 50, three stepping motors 68 for rotating each of the reels 22 through a motor drive circuit 67 are connected, and also a reel position detection circuit 69 is connected. When a motor drive signal is output to the motor drive circuit 67, each stepping motor 68 is driven to rotate by the motor drive circuit 67, thereby each reel 22 is rotated.

At that time, after each reel 22 is started to rotate, the number of drive pulses provided to each stepping motor 68 is calculated and the calculated value is written in the predetermined area of the RAM 52. And the reset pulse is output every one rotation of the reel 22 and such reset pulse is input to the CPU 50 through the reel position detection circuit 69. When the reset pulse is input to the CPU 50, the calculated value written in the RAM 52 is cleared in "0", and the CPU 50 recognizes the symbol rotational position in the reel 22, based on the calculated value corresponding to the rotational position of the reel 22 within one rotation and the symbol table in which the rotational position of the reel 22 stored in the ROM 51 and the symbols formed on outer peripheral plane of the reel 22 are corresponded with each other.

To the CPU 50, a hopper 71 is connected through a hopper drive circuit 70. When a drive signal is output to the hopper drive circuit 70 from the CPU 50, the hopper 71 pays out predetermined number of coins from the coin payout hole 15.

And to the CPU 50, a coin detection part 73 is connected through a payout completion signal circuit 72. The coin detection part 73 is arranged in the coin payout hole 15 and when the coin detection part 73 detects that a predetermined number of coins are paid out from the coin payout hole 15, the payout completion signal is output to the payout completion signal circuit 72 from the coin detection part 73. Based on this, the payout completion signal circuit 72 outputs the payout completion signal to the CPU 50.

Further, to the CPU 50, the upper liquid crystal display 3 is connected through a liquid crystal drive circuit 74 and the lower liquid crystal display 4 is connected through a liquid crystal drive circuit 75. And to the CPU 50, the touch panel 30 is connected through a touch panel drive circuit 76.

Further, to the CPU 50 LEDs 78 are connected through a LED drive circuit 77. A plurality of the LEDs 78 are arranged on the front plane of the slot machine 1 and the LEDs 78 are controlled so as to turn on based on the drive signals from the CPU 50. Further, a speaker 80 and a sound output circuit 79 are connected to the CPU 50 and the speaker 80 produces various effective sounds when various effects are conducted based on the output signal from the sound output circuit 79.

Next, the effect executed on the lower liquid crystal display 4 will be described. In the slot machine 1, following effect is done on the lower liquid crystal display 4 based on the programs and tables stored in the ROM 51. That is to say, when each reel 22 is started to rotate by each stepping motor 68 through the motor drive circuit 67, characters are displayed on the lower liquid crystal display 4 while being moved, through the liquid crystal drive circuit 75. At that time, the liquid crystal drive circuit 75 displays the characters while moving them so that the characters are superimposed with each of the display windows 23, 24 25 of the lower liquid crystal display 4, according to the following timing. Further, the motor drive circuit 67 stops rotation of each reel 22 through the stepping motor 68.

For example, the table shown in FIG. 15 is prepared in the ROM 51. In the table in FIG. 15, the effect A, in which the character is displayed on the lower liquid crystal display 4 while being moved, corresponds to the reel stop timing α. Here, the effect A corresponds to the effect in which the character displayed on the lower liquid crystal display 4 while being moved is superimposed with the left display window 23 after 3 seconds have passed from display start of the character, the character is superimposed with the center display window 24 after more 3 seconds have passed and the character is superimposed with the right display window 25 after further 3 seconds have passed.

And in the table shown in FIG. 15, the effect B and the effect C, in which the character is displayed on the lower liquid crystal display 4 while being moved, corresponds to the reel stop timing β. Here, the effect B and effect C correspond to the effect in which the character displayed on the lower liquid crystal display 4 while being moved is superimposed with the left display window 23 after 3 seconds have passed from display start of the character, the character is superimposed with the center display window 24 after more 2 seconds have passed and the character is superimposed with the right display window 25 after further 5 seconds have passed. But, the other moving manners of the character in the effect B and the effect C are made different with each other.

Further, in the table shown in FIG. 15, the effect D in which the character is displayed on the lower liquid crystal display 4 while being moved, corresponds to the reel stop timing γ. Here, the effect D correspond to the effect in which the character displayed on the lower liquid crystal display 4 while being moved is superimposed with the left display window 23 after 2 seconds have passed from display start of the character, the character is superimposed with the center display window 24 after more 0.5 seconds have passed and the character is superimposed with the right display window 25 after further 2.5 seconds have passed.

And in the ROM 51 a table shown in FIG. 16 is also prepared. In the table, according to control corresponding to the reel stop reel timing α, the left reel 22 is stopped through the motor drive circuit 67 after 3 seconds have passed from display start of the character, the center reel 22 is stopped after more 3 seconds have passed and the right reel 22 is stopped after further 3 seconds have passed. And in the table shown in FIG. 16, according to control corresponding to the reel stop reel timing β, the left reel 22 is stopped through the motor drive circuit 67 after 3 seconds have passed from display start of the character, the center reel 22 is stopped after more 2 seconds have passed and the right reel 22 is stopped after further 5 seconds have passed. And in the table shown in FIG. 16, according to control corresponding to the reel stop reel timing γ, the left reel 22 is stopped through the motor drive circuit 67 after 2 seconds have passed from display start of the character, the center reel 22 is stopped after more 0.5 seconds have passed and the right reel 22 is stopped after further 2.5 seconds have passed.

Therefore, when the player sees the lower liquid crystal display 4, the player can see the rotating symbols formed on the outer peripheries of the reels 22 through each of the display windows 23, 24, 25 of the lower liquid crystal display 4. At that time, if the effect A is conducted on the lower liquid crystal display 4 on which the character is displayed while being moved, the motor drive circuit 67 conducts control corresponding to the reel stop timing α. Accordingly, the player recognizes as follows. That is, the character moving on the lower liquid crystal display 4 crosses the left display window 23 after 3 seconds have passed from display start thereof, and at that time, rotation of the left reel 22 is stopped. And when more 3 seconds have passed, the character crosses the center display window 24 of the lower liquid crystal display 4, and at that time, rotation of the center reel 22 is stopped. Thereafter, when further 3 seconds have passed, the character crosses the right display window 25 of the lower liquid crystal display 4, and at that time, rotation of the right reel 22 is stopped.

And on the lower liquid crystal display 4 on which the character is displayed while being moved, if the effect B or the effect C is conducted though the liquid crystal drive circuit 75, the motor drive circuit 67 conducts control corresponding to the reel stop timing β. Accordingly, the player recognizes as follows. That is, the character moving on the lower liquid crystal display 4 crosses the left display window 23 after 3 seconds have passed from display start thereof, and at that time, rotation of the left reel 22 is stopped. And when more 2 seconds have passed, the character crosses the center display window 24 of the lower liquid crystal display 4, and at that time, rotation of the center reel 22 is stopped. Thereafter, when further 5 seconds have passed, the character crosses the right display window 25 of the lower liquid crystal display 4, and at that time, rotation of the right reel 22 is stopped.

And on the lower liquid crystal display 4 on which the character is displayed while being moved, if the effect D is conducted though the liquid crystal drive circuit 75, the motor drive circuit 67 conducts control corresponding to the reel stop timing γ. Accordingly, the player recognizes as follows. That is, the character moving on the lower liquid crystal display 4 crosses the left display window 23 after 2 seconds have passed from display start thereof, and at that time, rotation of the left reel 22 is stopped. And when more 0.5 seconds have passed, the character crosses the center display window 24 of the lower liquid crystal display 4, and at that time, rotation of the center reel 22 is stopped. Thereafter, when further 2.5 seconds have passed, the character crosses the right display window 25 of the lower liquid crystal display 4, and at that time, rotation of the right reel 22 is stopped.

That is to say, in the above effect, the motor drive circuit 67 successively stops rotation of the reels 22 at the timing that the character crosses each of the display windows 23, 24, 25 of the lower liquid crystal display 4, thus it can be given to the player seeing the lower liquid crystal display 4 the impression as if the character dynamically displayed on the lower liquid crystal display 4 is dynamically correlated with stop of rotation of each reel 22 which can be seen through the lower liquid crystal display 4 at the timing that the character crosses each of the display windows 23, 24, 25. Accordingly, it can be done the effect in which there is dynamic correlation between the character and the reels 22 and interest of the player for games can be raised.

By the way, in the above effect, rotation of the left reel 22 is stopped at the time that the character crosses the left display window 23 of the lower liquid crystal display 4, and thereafter rotation of the center reel 22 is stopped at the time that the character crosses the center display window 24, and thereafter, rotation of the right reel 22 is stopped at the time that the character crosses the right display window 25. At this point of view, stop order of the reels 22 is determined beforehand and is always same. However, in a case that each of effects A, B, C shown in FIG. 15 is defined as follows and a table shown in FIG. 17 is prepared instead of the table in FIG. 16, stop order of the reels 22 can be changed.

That is to say, as for the effect A in the table shown in FIG. 15, by the liquid crystal drive circuit 75, the character displayed on the lower liquid crystal display 4 while being moved is superimposed with the right display window 25 after 3 seconds have passed from display start thereof, and the character is superimposed with the center display window 24 after more 3 seconds have passed and is superimposed with the left display window 23 after further 3 seconds have passed. Further, as for the effect B and the effect C shown in FIG. 15, by the liquid crystal drive circuit 75, the character displayed on the lower liquid crystal display 4 while being moved is superimposed with the center display window 24 after 3 seconds have passed from display start thereof, and the character is superimposed with the right display window 25 after more 0.5 seconds have passed and is superimposed with the left display window 23 after further 2 seconds have passed. And as for the effect D shown in FIG. 15, by the liquid crystal drive circuit 75, the character displayed on the lower liquid crystal display 4 while being moved is superimposed with the left display window 23 after 2 seconds have passed from display start thereof, and the character is superimposed with the right display window 25 after more 2 seconds have passed and is superimposed with the center display window 24 after further 5 seconds have passed.

And in the ROM 51, the table shown in FIG. 17 is prepared. Here, in control corresponding to the reel stop timing α, the right reel 22 is stopped through the motor drive circuit 67 after 3 seconds have passed from display start of the character, and the center reel 22 is stopped after more 3 seconds have passed and the left reel 22 is stopped after further 3 seconds have passed. In the table shown in FIG. 17, in control corresponding to the reel stop timing β, the center reel 22 is stopped through the motor drive circuit 67 after 3 seconds have passed from display start of the character, and the right reel 22 is stopped after more 0.5 seconds have passed and the left reel 22 is stopped after further 2 seconds have passed. Further, in the table shown in FIG. 17, in control corresponding to the reel stop timing γ, the left reel 22 is stopped through the motor drive circuit 67 after 2 seconds have passed from display start of the character, and the right reel 22 is stopped after more 2 seconds have passed and the center reel 22 is stopped after further 5 seconds have passed.

Therefore, when the player sees the lower liquid crystal display 4, the player can see the rotating symbols formed on the outer peripheries of the reels 22 through each of the display windows 23, 24, 25 of the lower liquid crystal display 4. At that time, if the effect A is conducted on the lower liquid crystal display 4 on which the character is displayed while being moved, the motor drive circuit 67 conducts control corresponding to the reel stop timing α. Accordingly, the player recognizes as follows. That is, the character moving on the lower liquid crystal display 4 crosses the right display window 25 after 3 seconds have passed from display start thereof, and at that time, rotation of the right reel 22 is stopped. And when more 3 seconds have passed, the character crosses the center display window 24 of the lower liquid crystal display 4, and at that time, rotation of the center reel 22 is stopped. Thereafter, when further 3 seconds have passed, the character crosses the left display window 23 of the lower liquid crystal display 4, and at that time, rotation of the left reel 22 is stopped.

And on the lower liquid crystal display 4 on which the character is displayed while being moved, if the effect B or the effect C is conducted though the liquid crystal drive circuit 75, the motor drive circuit 67 conducts control corresponding to the reel stop timing β. Accordingly, the player recognizes as follows. That is, the character moving on the lower liquid crystal display 4 crosses the center display window 24 after 3 seconds have passed from display start thereof, and at that time, rotation of the center reel 22 is stopped. And when more 0.5 seconds have passed, the character crosses the right display window 25 of the lower liquid crystal display 4, and at that time, rotation of the right reel 22 is stopped. Thereafter, when further 2 seconds have passed, the character crosses the left display window 23 of the lower liquid crystal display 4, and at that time, rotation of the left reel 22 is stopped.

And on the lower liquid crystal display 4 on which the character is displayed while being moved, if the effect D is conducted though the liquid crystal drive circuit 75, the motor drive circuit 67 conducts control corresponding to the reel stop timing γ. Accordingly, the player recognizes as follows. That is, the character moving on the lower liquid crystal display 4 crosses the left display window 23 after 2 seconds have passed from display start thereof, and at that time, rotation of the left reel 22 is stopped. And when more 2 seconds have passed, the character crosses the right display window 25 of the lower liquid crystal display 4, and at that time, rotation of the right reel 22 is stopped. Thereafter, when further 5 seconds have passed, the character crosses the center display window 24 of the lower liquid crystal display 4, and at that time, rotation of the center reel 22 is stopped.

Thereby, in the above effect, rotation of the left reel 22 is stopped at the time that the character crosses the left display window 23 of the lower liquid crystal display 4 and rotation of the center reel 22 is stopped at the time that the character crosses the center display window 24 of the lower liquid crystal display 4 and rotation of the right reel 22 is stopped at the time that the character crosses the right display window 25 of the lower liquid crystal display 4. As mentioned, stop order of the reels 22 can be changed.

And in the above effect, the motor drive circuit 67 successively stops rotation of the reels 22 at the timing that the character crosses each of the display windows 23, 24, 25 of the lower liquid crystal display 4, thus it can be given to the player seeing the lower liquid crystal display 4 the impression as if the character dynamically displayed on the lower liquid crystal display 4 is dynamically correlated with stop of rotation of each reel 22 which can be seen through the lower liquid crystal display 4 at the timing that the character crosses each of the display windows 23, 24, 25. Accordingly, it can be done the effect in which there is dynamic correlation between the character and the reels 22 and interest of the player for games can be raised.

Here, in the above mentioned two kinds of effects, on the assumption that the effect A, the effect B and the effect C stored in the table shown in FIG. 15 exist, each control contents of the reel stop timing α, the reel stop timing β and the reel stop timing γ stored in the table shown in FIGS. 16 and 17 are defined. Namely, control contents by the motor drive circuit 67 concerning with start and stop of rotation of each reel 22 are determined according to moving contents of the character which is displayed on the lower liquid crystal display 4 through the liquid crystal drive circuit 75. On the contrary, in a case that following tables are prepared, moving contents of the character, which is displayed on the lower liquid crystal display 4 through the liquid crystal drive circuit 75, can be determined according to control contents by the motor drive circuit 67 concerning with start and stop of rotation of each reel 22.

In order to conduct the above control, for example, a table shown in FIG. 19 is prepared in the ROM 51, and control contents by the motor drive circuit 67 concerning with start and stop of rotation of each reel 22 will be unitarily defined. In the table shown in FIG. 19, the right reel 22 is stopped through the motor drive circuit 67 after 3 seconds have passed from start of rotation of the reels 22, and the center reel 22 is stopped after more 3 seconds have passed and the left reel 22 is stopped after further 3 seconds have passed.

And in the ROM 51, a table shown in FIG. 18 is prepared. The effect A, the effect B, the effect C and the effect D are defined according to moving contents of the character which is displayed on the lower liquid crystal display 4 through the liquid crystal drive circuit 75. Here, the effect A is defined as the effect that the character, which is displayed on the lower liquid crystal display 4 while being moved through the liquid crystal drive circuit 75, is superimposed with the center display window 24 after 6 seconds have passed from start of rotation of the reels 22. The effect B is defined as the effect that the character, which is displayed on the lower liquid crystal display 4 while being moved through the liquid crystal drive circuit 75, is superimposed with the right display window 25 after 3 seconds have passed from start of rotation of the reels 22. Further, the effect C is defined as the effect that the character, which is displayed on the lower liquid crystal display 4 while being moved through the liquid crystal drive circuit 75, is superimposed with the right display window 25 after 3 seconds have passed from start of rotation of the reels 22, and is superimposed with the center display window 24 after more 3 seconds have passed and is superimposed with the left display window 23 after further 3 seconds have passed. The effect D is defined as the effect that character, which is displayed on the lower liquid crystal display 4 while being moved through the liquid crystal drive circuit 75, is superimposed with the left display window 23 after 9 seconds have passed from start of rotation of the reels 22.

Therefore, when the player sees the lower liquid crystal display 4, the player can see the rotating symbols formed on the outer peripheries of the reels 22 through each of the display windows 23, 24, 25 of the lower liquid crystal display 4. At that time, if the effect A is conducted through the liquid crystal drive circuit 75 on the lower liquid crystal display 4 on which the character is displayed while being moved, the player recognizes as follows. That is, rotation of the right reel 22 is stopped at the time that 3 seconds have passed from start of rotation of the reels 22, and the character crosses the center display window 24 of the lower liquid crystal display 4 after more 3 seconds have passed and at that time rotation of the center reel 22 is stopped, and rotation of the left reel 22 is stopped after further 3 seconds have passed.

And if the effect B is conducted through the liquid crystal drive circuit 75 on the lower liquid crystal display 4 on which the character is displayed while being moved, the player recognizes as follows. That is, the character crosses the right display window 25 of the lower liquid crystal display 4 and at that time rotation of the right reel 22 is stopped, and rotation of the center reel 22 is stopped after more 3 seconds have passed and rotation of the left reel 22 is stopped after further 3 seconds have passed.

And if the effect C is conducted through the liquid crystal drive circuit 75 on the lower liquid crystal display 4 on which the character is displayed while being moved, the player recognizes as follows. That is, the character crosses the right display window 25 of the lower liquid crystal display 4 after 3 seconds have passed from start of rotation of the reels 22, and at that time, rotation of the right reel 22 is stopped. And when more 3 seconds have passed, the character crosses the center display window 24 of the lower liquid crystal display 4, and at that time, rotation of the center reel 22 is stopped. Thereafter, when further 3 seconds have passed, the character crosses the left display window 23 of the lower liquid crystal display 4, and at that time, rotation of the left reel 22 is stopped.

And if the effect D is conducted through the liquid crystal drive circuit 75 on the lower liquid crystal display 4 on which the character is displayed while being moved, the player recognizes as follows. That is, rotation of the right reel 22 is stopped after 3 seconds have passed from start of rotation of the reels 22. And when more 3 seconds have passed, rotation of the center reel 22 is stopped. Thereafter, when further 3 seconds have passed, the character crosses the left display window 23 of the lower liquid crystal display 4, and at that time, rotation of the left reel 22 is stopped.

That is to say, in the above mentioned effect, the motor drive circuit 67 stops rotation of each reel 22 respectively based on the contents stored in the simplest table (shown in FIG. 19), thereby rotation of each reel 22 is stopped at the timing that the character crosses each of the display windows 23, 24, 25 of the lower liquid crystal display 4. Accordingly, it can be given to the player seeing the lower liquid crystal display 4 the impression as if the character dynamically displayed on the lower liquid crystal display 4 is dynamically correlated with stop of rotation of each reel 22 which can be seen through the lower liquid crystal display 4 at the timing that the character crosses each of the display windows 23, 24, 25. Accordingly, it can be done the effect in which there is dynamic correlation between the character and the reels 22 and interest of the player for games can be raised.

Figure 14:
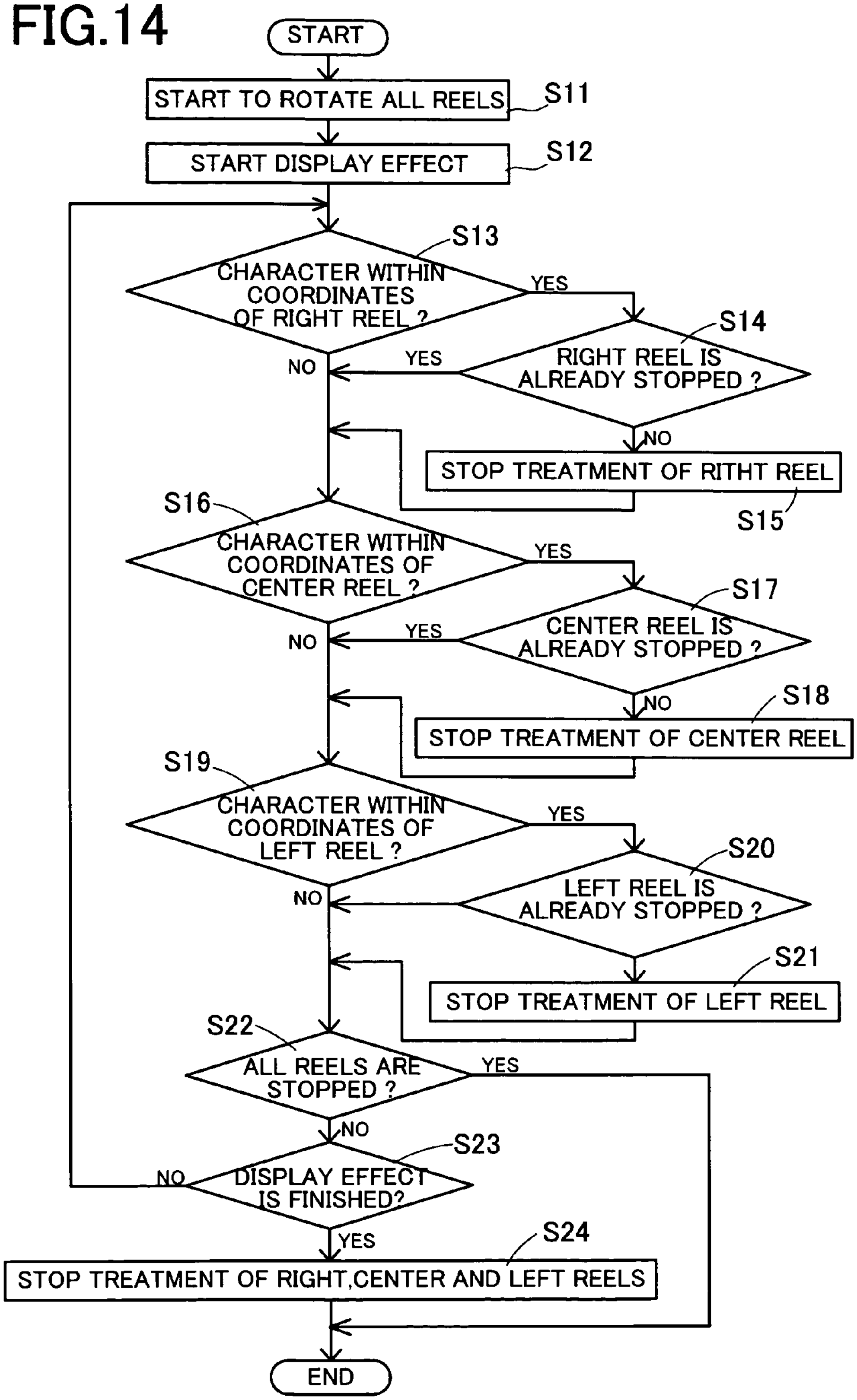
FIG. 14 is a flowchart showing a control procedure to execute effect contents done on the lower liquid crystal display.

Here, in the above three kinds of effects, based on that the tables shown in FIGS. 15~19 are prepared, moving contents of the character displayed on the lower liquid crystal display 4 through the liquid crystal drive circuit 75 are correlated with control contents concerning with start and stop of rotation of each reel 22 by the motor drive circuit 67. On the contrary, in a case that the program represented by the flowchart shown in FIG. 14 is prepared in the ROM 51 and control of start and stop of rotation of each reel 22 is executed by the motor drive circuit 67 according to the flowchart, reel stop control can be done as follows. That is, rotation of the right reel 22 can be stopped at the time that the character crosses the right display window 25 of the lower liquid crystal display 4, rotation of the center reel 22 can be stopped at the time that the character crosses the center display window 24 of the lower liquid crystal display 4 and rotation of the left reel 22 can be stopped at the time that the character crosses the left display window 23, although there exist various moving contents of the character displayed on the lower liquid crystal display 4 through the liquid crystal drive circuit 75, in other words, with no relation of the order according to which the character crosses each of the display windows 23, 24, 25.

Here, the flowchart shown in FIG. 14 will be described. At first, in step (abbreviated as "S" hereinafter) 11, all reels 22 are started to rotate by the motor drive circuit 67. Thereafter, in S12, display of the character is started on the lower liquid crystal display 4 by the liquid crystal drive circuit 75, thereby the character starts to move on the lower liquid crystal display 4.

Next, in S13, it is determined whether or not the character exists within coordinates specifying area of the right display window 25 of the lower liquid crystal display 4. At that time, if it is determined that the character does not exist within the coordinates of the right display window 25 of the lower liquid crystal display 4 (S13: NO), the procedure directly shifts to S16. On the contrary, if it is determined that the character exists within the coordinates of the right display window 25 of the lower liquid crystal display 4 (S13: YES), the procedure shifts to S14 and it is determined whether rotation of the right reel 22 is already stopped or not in S14. Here, if it is determined that rotation of the right reel 22 is already stopped (S14: YES), the procedure directly shifts to S19. But, if it is determined that rotation of the right reel 22 is not already stopped (S14: NO), the procedure shifts to S15 and rotation of the right reel 22 is stopped by the motor drive circuit 67 in S15, thereafter the procedure shifts to S16.

In S16, it is determined whether or not the character exists within coordinates specifying area of the center display window 24 of the lower liquid crystal display 4. At that time, if it is determined that character does not exist within the coordinates of the center display window 24 of the lower liquid crystal display 4 (S16: NO), the procedure directly shifts to S19. On the contrary, if it is determined that the character exists within the coordinates of the center display window 24 of the lower liquid crystal display 4 (S16: YES), the procedure shifts to S17 and it is determined whether rotation of the center reel 22 is already stopped or not in S17. Here, if it is determined that rotation of the center reel 22 is already stopped (S17: YES), the procedure directly shifts to S19. But, if it is determined that rotation of the center reel 22 is not already stopped (S17: NO), the procedure shifts to S18 and rotation of the center reel 22 is stopped by the motor drive circuit 67 in S18, thereafter the procedure shifts to S19.

In S19, it is determined whether or not the character exists within coordinates specifying area of the left display window 23 of the lower liquid crystal display 4. At that time, if it is determined that the character does not exist within the coordinates of the left display window 23 of the lower liquid crystal display 4 (S19: NO), the procedure directly shifts to S22. On the contrary, if it is determined that the character exists within the coordinates of the left display window 23 of the lower liquid crystal display 4 (S19: YES), the procedure shifts to S20 and it is determined whether rotation of the left reel 22 is already stopped or not in S20. Here, if it is determined that rotation of the left reel 22 is already stopped (S20: YES), the procedure directly shifts to S22. But, if it is determined that rotation of the left reel 22 is not already stopped (S20: NO), the procedure shifts to S21 and rotation of the left reel 22 is stopped by the motor drive circuit 67 in S21, thereafter the procedure shifts to S22.

In S22, it is determined whether rotation of all reels 22 is already stopped or not. Here, if it is determined that rotation of all reels 22 is already stopped (S22: YES), the procedure is finished. On the contrary, if it is determined that rotation of all reels 22 is already not stopped (S22: NO), the procedure shifts to S23 and it is determined whether or not display effect of the character on the lower liquid crystal display 4 done by the liquid crystal drive circuit 75 is finished. Here, if it is determined that display effect of character on the lower liquid crystal display 4 is not finished (S23: NO), the procedure returns to S13 and the above procedure is repeated. On the other hand, if it is determined that display effect of character on the lower liquid crystal display 4 is finished (S23: YES), the procedure shifts to S24 and the rotating reel 22 is stopped by the motor drive circuit 67 and after rotation of all reels 22 is finished, the procedure is finished.

That is to say, in the above effect, the motor drive circuit 67 successively stops rotation of the reels 22 at the timing that the character crosses each of the display windows 23, 24, 25 of the lower liquid crystal display 4, thus it can be given to the player seeing the lower liquid crystal display 4 the impression as if the character dynamically displayed on the lower liquid crystal display 4 is dynamically correlated with stop of rotation of each reel 22 which can be seen through the lower liquid crystal display 4 at the timing that the character crosses each of the display windows 23, 24, 25. Accordingly, it can be done the effect in which there is dynamic correlation between the character and the reels 22 and interest of the player for games can be raised.

Further, in the above effect, it is determined each timing that the character crosses each of the display windows 23, 24, 25 based on the character dynamically displayed on the lower liquid crystal display 4 and the coordinates specifying area of each display window 23, 24, 25 (S13, S16, S19). Therefore, if display effect of the character dynamically displayed on the lower liquid crystal display 4 is exchanged in order, rotation of the reel 22 can independently be stopped at the timing that the character crosses each of the display windows 23, 24, 25 on the lower liquid crystal display 4. Therefore, the above control can be flexibly corresponded to display effect of variegated characters.

Figure 6:
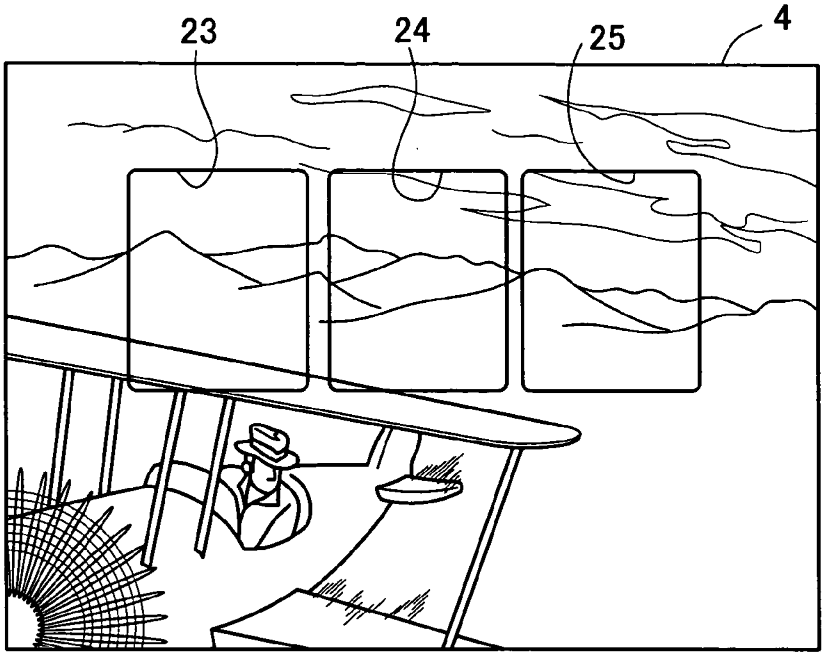
FIG. 6 is an explanatory view showing one scene of effect contents according to a first example, the effect being conducted on the lower liquid crystal display.

Next, examples that the player recognizes the character will be described. FIGS. 6~9 shows the first example in which a person flying in the sky and a condor gliding in the sky are displayed on the lower liquid crystal display 4 through the liquid crystal drive circuit 75 as the effect contents. That is to say, when each of the reels 22 is started to rotate and the effect on the lower liquid crystal display 4 is started, the person flying in the sky by an airplane is displayed on the lower liquid crystal display 4 as shown in FIG. 6. At that time, the background image of the person flying in the sky by the airplane is displayed in each of the display windows 23, 24, 25 of the lower liquid crystal display 4, and further rotating symbols formed on the outer peripheries of the reels 22 can be seen through each of the display windows 23, 24, 25.

Here, in FIG. 6, for convenience to clearly indicate the display effect, the symbols formed on the outer peripheries of the reels 22 are omitted. Similarly, this omission is done in FIGS. 7~9.

Figure 7:
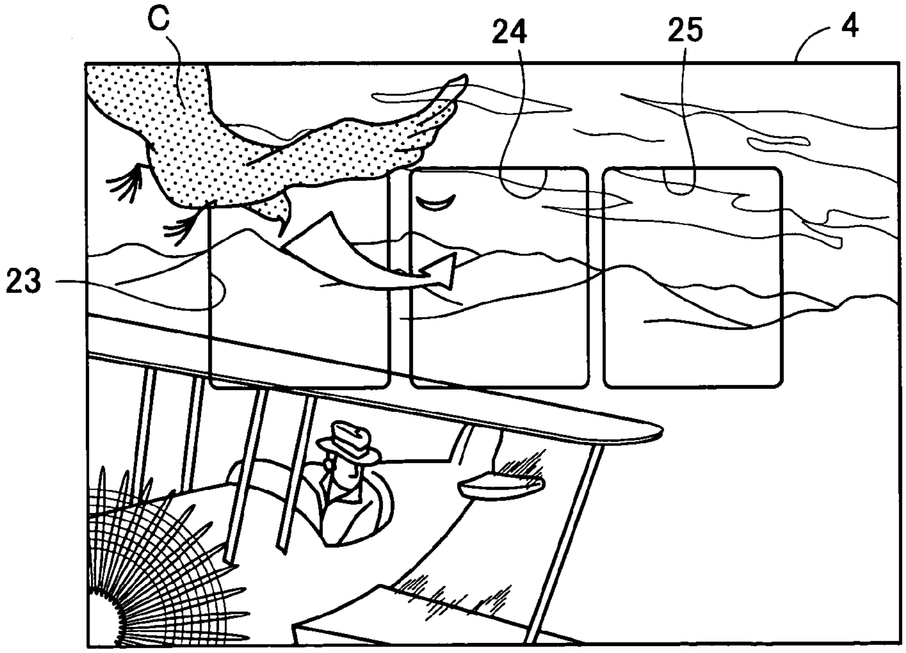
FIG. 7 is an explanatory view showing the next one scene of effect contents continuous to the scene shown in FIG. 6, according to the first example, the effect being conducted on the lower liquid crystal display.
Figure 8:
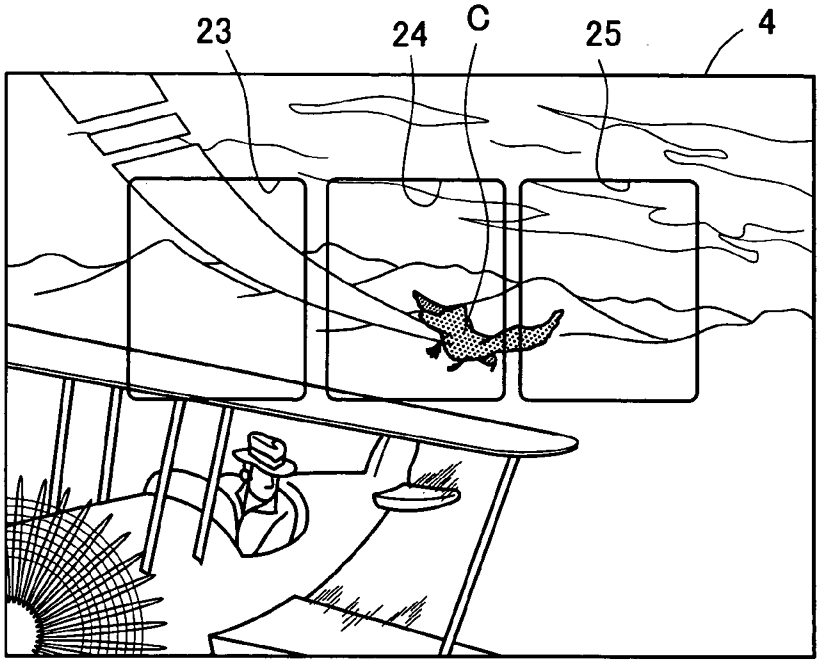
FIG. 8 is an explanatory view showing the next one scene of effect contents continuous to the scene shown in FIG. 7, according to the first example, the effect being conducted on the lower liquid crystal display.
Figure 9:
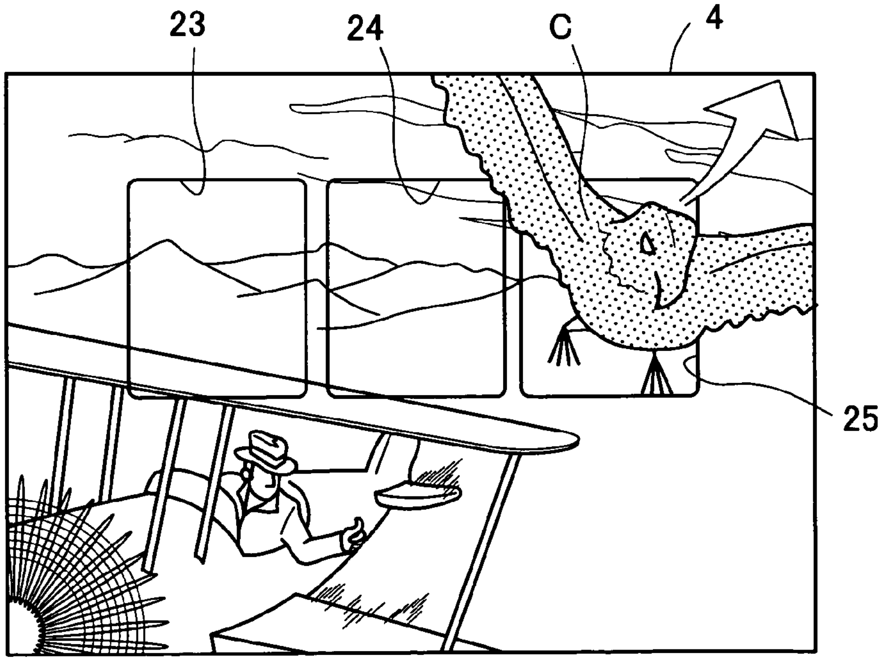
FIG. 9 is an explanatory view showing the next one scene of effect contents continuous to the scene shown in FIG. 8, according to the first example, the effect being conducted on the lower liquid crystal display.

And as shown in FIG. 7, the condor C which is the moving character appears on the lower liquid crystal display 4. And when the condor C reaches in the left display window 23, rotation of the left reel 22 is stopped and the player can see the symbol formed on the outer periphery of the left reel 22 through the left display window 23. Further, as shown in FIG. 8, when the condor C reaches in the center display window 24, rotation of the center reel 22 is stopped and the player can see the symbol formed on the outer periphery of the center reel 22 through the center display window 24. And further, as shown in FIG. 9, when the condor C reaches in the right display window 25, rotation f the right reel 22 is stopped and the player can see the symbol formed on the outer periphery of the right reel 22 through the right display window 25.

Therefore, when the player sees the lower liquid crystal display 4, the player can see the rotating symbols formed on the outer peripheries of the reels 22 through each of the display windows 23, 24, 25 of the lower liquid crystal display 4. At that time, the player recognizes as follows. That is, if the condor C moving on the lower liquid crystal display 4 crosses the left display window 23, rotation of the left reel 22 is stopped. And when the condor C crosses the center display window 24 of the lower liquid crystal display 4, rotation of the center reel 22 is stopped. Further, when the condor C crosses the right display window 25 of the lower liquid crystal display 4, rotation of the right reel 22 is stopped.

That is to say, in the first example, the motor drive circuit 67 successively stops rotation of the reels 22 at the timing that the condor C crosses each of the display windows 23, 24, 25 of the lower liquid crystal display 4, thus it can be given to the player seeing the lower liquid crystal display 4 the impression as if the condor C dynamically displayed on the lower liquid crystal display 4 is dynamically correlated with stop of rotation of each reel 22 which can be seen through the lower liquid crystal display 4 at the timing that the condor C crosses each of the display windows 23, 24, 25. Accordingly, it can be done the effect in which there is dynamic correlation between the condor C and the reels 22 and interest of the player for games can be raised.

Figure 10:
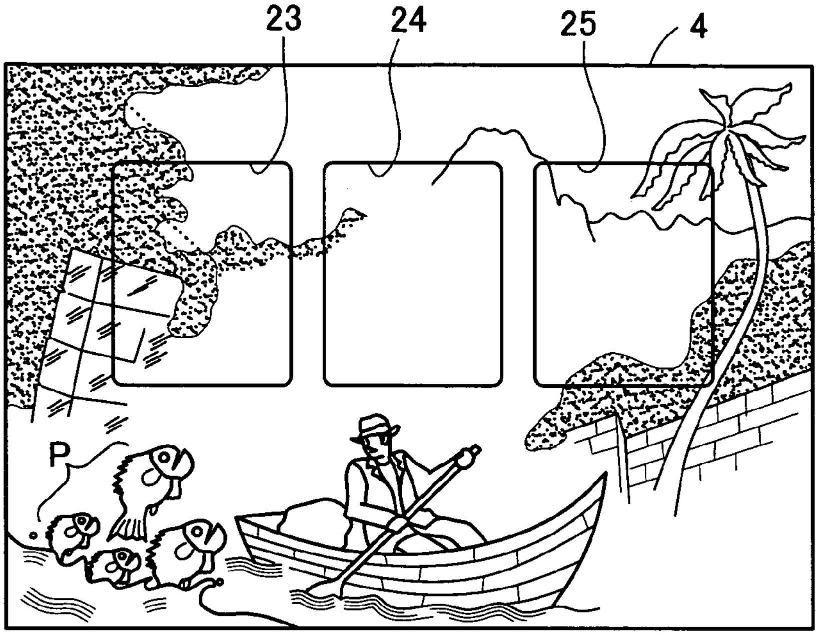
FIG. 10 is an explanatory view showing one scene of effect contents according to a second example, the effect being conducted on the lower liquid crystal display.

On the other hand, FIGS. 10~13 shows the second example in which a person rowing the boat in the river and piranhas P jumping from the surface of the river are displayed on the lower liquid crystal display 4 through the liquid crystal drive circuit 75 as the effect contents. That is to say, when each of the reels 22 is started to rotate and the effect on the lower liquid crystal display 4 is started, the person rowing the boat in the river and the piranhas P jumping from the surface of the river are displayed on the lower liquid crystal display 4 as shown in FIG. 10. At that time, the background image of the person rowing the boat in the river is displayed in each of the display windows 23, 24, 25 of the lower liquid crystal display 4, and further rotating symbols formed on the outer peripheries of the reels 22 can be seen through each of the display windows 23, 24, 25.

Here, in FIG. 10, for convenience to clearly indicate the display effect, the symbols formed on the outer peripheries of the reels 22 are omitted. Similarly, this omission is done in FIGS. 11~13.

Figure 11:
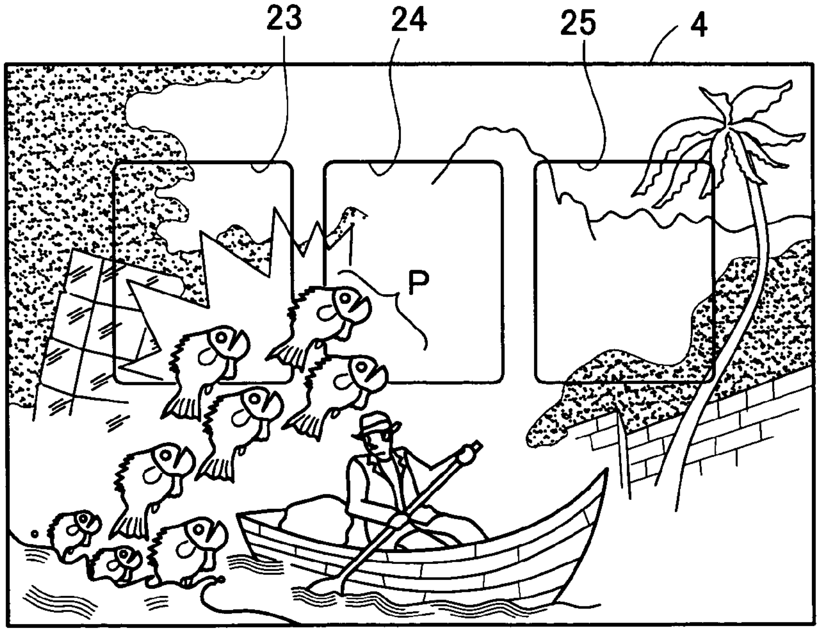
FIG. 11 is an explanatory view showing the next one scene of effect contents continuous to the scene shown in FIG. 10, according to the second example, the effect being conducted on the lower liquid crystal display.
Figure 12:
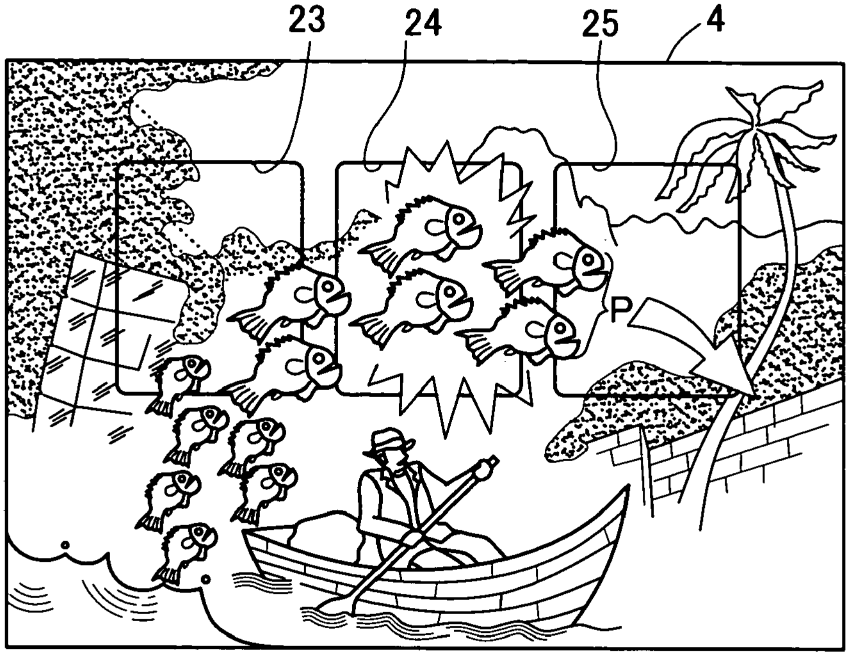
FIG. 12 is an explanatory view showing the next one scene of effect contents continuous to the scene shown in FIG. 11, according to the second example, the effect being conducted on the lower liquid crystal display.
Figure 13:
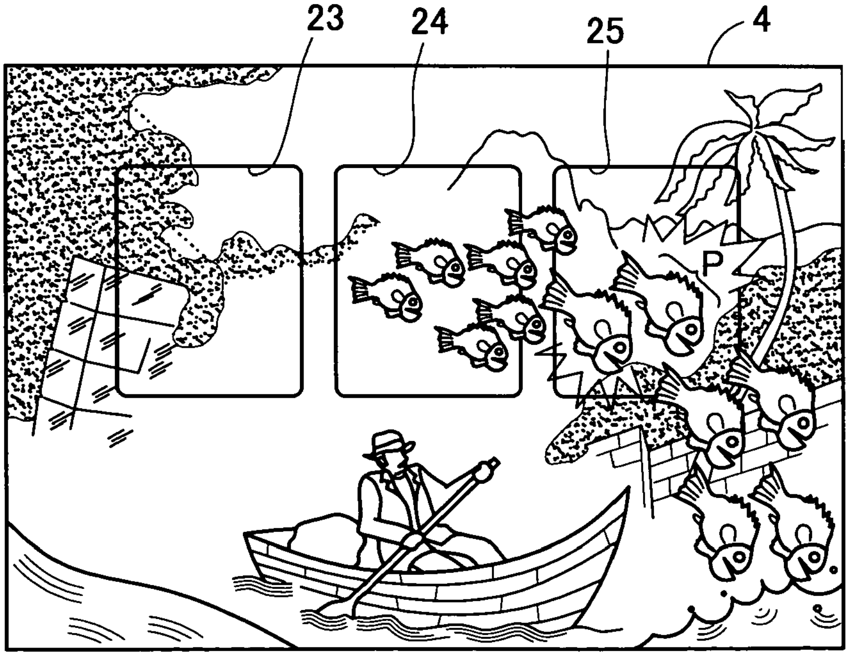
FIG. 13 is an explanatory view showing the next one scene of effect contents continuous to the scene shown in FIG. 12, according to the second example, the effect being conducted on the lower liquid crystal display.

And as shown in FIG. 11, a few of the piranhas P which are the moving character appear on the lower liquid crystal display 4. And when the piranhas P reach in the left display window 23, rotation of the left reel 22 is stopped and the player can see the symbol formed on the outer periphery of the left reel 22 through the left display window 23. Further, as shown in FIG. 12, when the piranhas P reach in the center display window 24, rotation of the center reel 22 is stopped and the player can see the symbol formed on the outer periphery of the center reel 22 through the center display window 24. And further, as shown in FIG. 13, when the piranhas P reach in the right display window 25, rotation f the right reel 22 is stopped and the player can see the symbol formed on the outer periphery of the right reel 22 through the right display window 25.

Therefore, when the player sees the lower liquid crystal display 4, the player can see the rotating symbols formed on the outer peripheries of the reels 22 through each of the display windows 23, 24, 25 of the lower liquid crystal display 4. At that time, the player recognizes as follows. That is, if a few of the piranhas P moving on the lower liquid crystal display 4 cross the left display window 23, rotation of the left reel 22 is stopped. And when the piranhas P cross the center display window 24 of the lower liquid crystal display 4, rotation of the center reel 22 is stopped. Further, when the piranhas P cross the right display window 25 of the lower liquid crystal display 4, rotation of the right reel 22 is stopped.

That is to say, in the second example, the motor drive circuit 67 successively stops rotation of the reels 22 at the timing that the piranhas P cross each of the display windows 23, 24, 25 of the lower liquid crystal display 4, thus it can be given to the player seeing the lower liquid crystal display 4 the impression as if the piranhas P dynamically displayed on the lower liquid crystal display 4 is dynamically correlated with stop of rotation of each reel 22 which can be seen through the lower liquid crystal display 4 at the timing that the piranhas P cross each of the display windows 23, 24, 25. Accordingly, it can be done the effect in which there is dynamic correlation between the piranhas P and the reels 22 and interest of the player for games can be raised.

Here, in the first example or the second example, the effect is done as follows. That is, rotation of the left reel 22 is stopped at the time that the condor C or a few of the piranhas P crosses or cross the left display window 23 of the lower liquid crystal display 4, and thereafter when the condor C or the piranhas P crosses or cross the center display window 24 of the lower liquid crystal display 4, rotation of the center reel 22 is stopped, and thereafter when the condor C or the piranhas P crosses or cross the right display window 25 of the lower liquid crystal display 4, rotation of the right reel 22 is stopped. Therefore, in order to execute the first example or the second example, the reel stop timing α in the table in FIG. 16 has to be selected and the program according to the flowchart shown in FIG. 14 has to be executed in the above effect (concerning with the control).

Here, the present invention is not limited to the embodiment and various changes can be done within the scope of the present invention.

For example, in the above embodiment, rotation of the right reel 22 is stopped at the time that the character crosses the right display window 25 of the lower liquid crystal display 4, and rotation of the center reel 22 is stopped at the time that the character crosses the center display window 24 of the lower liquid crystal display 4, and further rotation of the left reel 22 is stopped at the time that the character crosses the left display window 23 of the lower liquid crystal display 4. At this point of view, as the time that the character crosses each of the display windows 23, 24, 25, it is conceivable the time that the character enters in each of the display windows 23, 24, 25 of the lower liquid crystal display 4, the time that the character stops in each of the display windows 23, 24, 25 and the time that the character comes out from each of the display windows 23, 24, 25, in addition to the time that the character passes through each of the display windows 23, 24, 25, according to recognition of the player.

And in the above embodiment, rotation of each reel 22 is stopped at the time that the character crosses each of the display windows 23, 24 25 of the lower liquid crystal display 4. In particular, in the slot machine 1, as mentioned, various winning combinations are determined beforehand based on a plural kinds of combinations of symbols formed on the outer periphery of each reel 22, and when the symbol combination corresponding to the winning combination is stopped along the pay line L of the lower liquid crystal display 4 (see FIG. 1), coins are paid out from the coin payout hole 15 corresponding to the winning combination. Further, based on that the direction-map symbol existing on the outer periphery of the left reel 22, the lake-map symbol existing on the outer periphery of the center reel 22 and the trigger symbol existing on the outer periphery of the right reel 22 are stopped along the pay line L, various bonus games can be obtained. Therefore, since stop of rotation of each reel 22 remarkably influences the game contents done in the slot machine 1 and the impression given to the player becomes very strong, it can be effectively done the effect in which the character and the reels 22 are dynamically combined.

Here, taking the effect, in which the character and the reels 22 are dynamically combined, into consideration, rotational speed of the reel 22 may be changed at the time that the character crosses each of the display windows 23, 24, 25 of the lower liquid crystal display 4. For example, when the character crosses the right display window 25 of the lower liquid crystal display 4, rotation of the right reel 22 may be stopped after rotational speed thereof is rapidly increased or decreased, thereafter rotation of the center reel 22 may be stopped after rotational speed thereof is rapidly increased or decreased at the time that the character crosses the center display window 24 of the lower liquid crystal display 4, and further rotation of the left reel 22 may be stopped after rotational speed thereof is rapidly increased or decreased at the time that the character crosses the left display window 23 of the lower liquid crystal display 4. According to this, it can be given to the player seeing the lower liquid crystal display 4 the impression as if the character is dynamically correlated with change in operation of each reel 22. Therefore, it can be done the effect in which there is dynamic correlation between the character and the reels 22 and interest of the player for games can be raised.

What is claimed is:

1. A gaming machine comprising:

a plurality of mechanical reels which are mechanically driven;

a reel controller for changing operation of each mechanical reel;

a display device which is arranged in front of the mechanical reels and has a plurality of reel display windows, each of the mechanical reels being seen through each of the reel display windows;

a display controller for controlling the display device so as to display a character on the display device; and a memory for storing a control table in which there are stored one relation between one mechanical reel among plural mechanical reels and a time lapsing till the character crosses one reel display window corresponding to the one mechanical reel from a display start of the character on the display device and another relation between another mechanical reel and a time lapsing till the character crosses another reel display window corresponding to the another mechanical reel after the character crosses the one reel display window;

wherein the character is dynamically displayed on the display device by the display controller; and wherein the one mechanical reel is stopped at a timing that the character crosses the one reel display window and the another mechanical reel is stopped at a timing that the character crosses the another reel display window, based on the control table stored in the memory under a control through the reel controller.

2. The gaming machine according to claim 1, further comprising:

a determination device for determining whether the character displayed on the display device exists within coordinates specifying each reel display window or not;

wherein when the determination device determines that the character exists within the coordinates of each reel display window, the reel controller stops the reel corresponding to the reel display window.

3. A gaming machine comprising:

a plurality of mechanical reels which are mechanically driven;

a reel controller for changing operation of each mechanical reel;

a display device which is arranged in front of the mechanical reels and has a plurality of reel display windows, each of the mechanical reels being seen throuqh each of the reel display windows;

a display controller for controlling the display device so as to display a character on the display device; and a first memory for storing a first control table in which there are stored one reel relation between one mechanical reel among plural mechanical reels and a first reel rotation time lapsing till the one mechanical reel stops to rotate from a rotation start thereof and another reel relation between another mechanical reel and a second reel rotation time lapsing till the another mechanical reel stops to rotate after the one mechanical reel stops to rotate; and a second memory for storing a second control table in which there are stored a first character display time lapsing till the character crosses one reel display window corresponding to the one mechanical reel from a display start of the character on the display device and a second character display time lapsing till the character crosses another reel display window corresponding to the another mechanical reel after the character crosses the one reel display window;

wherein the character is dynamically displayed on the display device by the display controller;

wherein the first reel rotation time is set equally to the first character display time and the second reel rotation time is set equally to the second character display time; and wherein the one mechanical reel is stopped at a timing that the character crosses the one reel display window and the another mechanical reel is stopped at a timing that the character crosses the another reel display window, based on the first control table stored in the first memory and the second control table stored in the second memory under a control through the reel controller.

* * * * *